(12) United States Patent
Wada et al.

(10) Patent No.: US 8,289,638 B2
(45) Date of Patent: Oct. 16, 2012

(54) LENS DRIVING DEVICE

(75) Inventors: Akihito Wada, Nagano (JP); Toshifumi Tsuruta, Nagano (JP)

(73) Assignee: Nidec Sankyo Corporation (JP)

( * ) Notice: Subject to any disclaimer, the term of this patent is extended or adjusted under 35 U.S.C. 154(b) by 206 days.

(21) Appl. No.: 12/594,052

(22) PCT Filed: Mar. 25, 2008

(86) PCT No.: PCT/JP2008/000710
§ 371 (c)(1),
(2), (4) Date: Feb. 9, 2010

(87) PCT Pub. No.: WO2008/129827
PCT Pub. Date: Oct. 30, 2008

(65) Prior Publication Data
US 2010/0149667 A1    Jun. 17, 2010

(30) Foreign Application Priority Data

Mar. 30, 2007  (JP) ................................. 2007-093938

(51) Int. Cl.
*G02B 7/02* (2006.01)
(52) U.S. Cl. ....................................................... 359/824

(58) Field of Classification Search .................. 359/704, 359/824
See application file for complete search history.

(56) References Cited

U.S. PATENT DOCUMENTS
2009/0303621 A1* 12/2009 Sue et al. ...................... 359/824

FOREIGN PATENT DOCUMENTS
| JP | 5-264878 A | 10/1993 |
| JP | 2005-37865 A | 2/2005 |
| WO | 2007/026830 A1 | 3/2007 |

OTHER PUBLICATIONS

International Search Report for International Application No. PCT/JP2008/000710 mailed May 1, 2008 with English translation.

* cited by examiner

*Primary Examiner* — Joseph P Martinez
(74) *Attorney, Agent, or Firm* — Cantor Colburn LLP

(57) ABSTRACT

A lens driving device may include a movable lens body which holds a lens, and a driving mechanism for moving the movable lens body in an optical axis direction. The driving mechanism includes coils attached to the movable lens body, and a magnet opposed to the coils. When a gap between the coils and the magnet is expressed as A, and the width of the coil is expressed as B, a conditional expression of $0.3B \leq A \leq B$ is satisfied.

7 Claims, 8 Drawing Sheets

Fig.3(A)
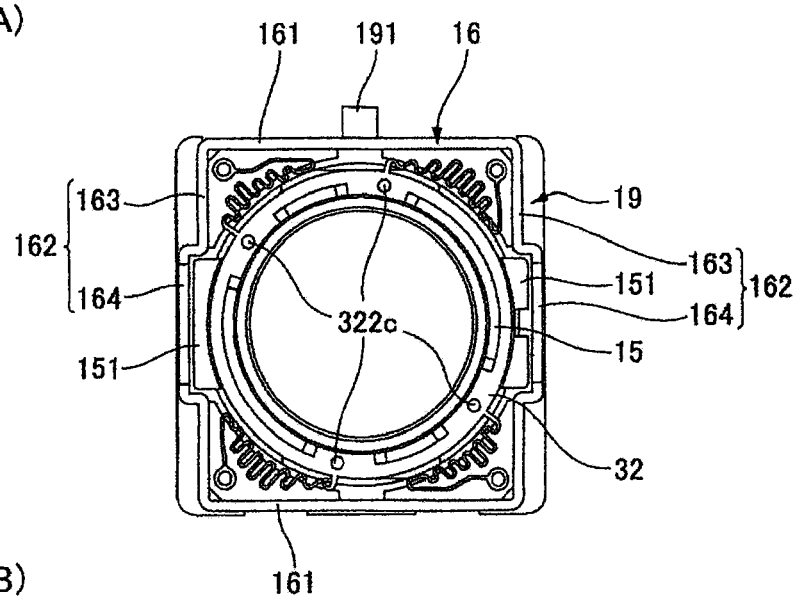
Fig.3(B)
Fig.3(C)
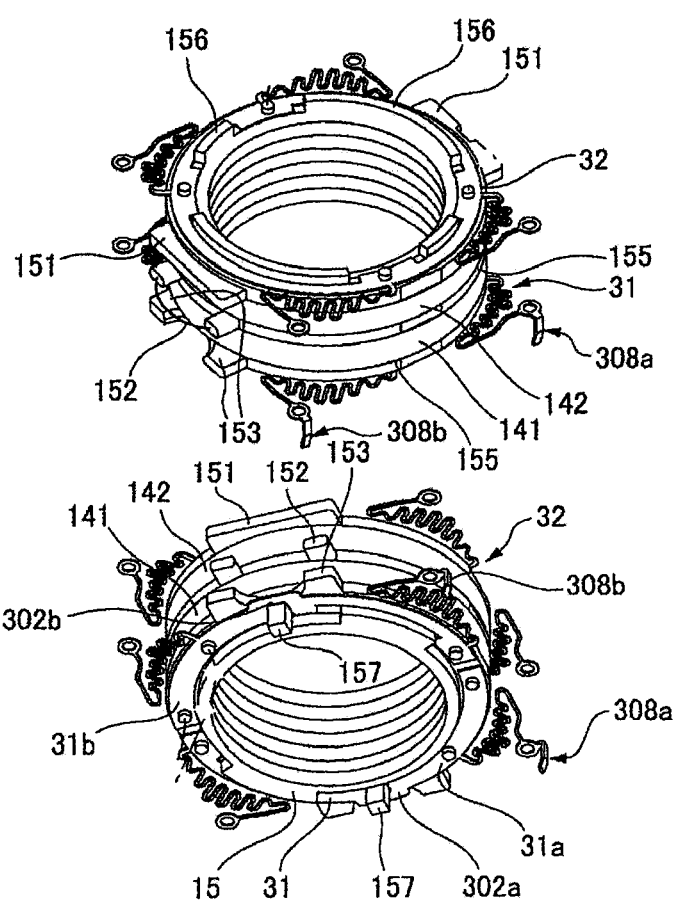

Ampere-turn of a coil is kept constant

| b-a | c-a | (c-a)/(b-a) | coil thrust force[g] |
|---|---|---|---|
| 2.40 | 2.55 | 1.06 | 0.78 |
| 1.50 | 1.65 | 1.10 | 1.40 |
| 1.20 | 1.35 | 1.13 | 1.73 |
| 0.90 | 1.05 | 1.17 | 2.16 |
| 0.60 | 0.75 | 1.25 | 2.80 |
| 0.45 | 0.60 | 1.33 | 3.19 |
| 0.30 | 0.45 | 1.50 | 3.65 |
| 0.15 | 0.30 | 2.00 | 4.22 |

LENS DRIVING DEVICE

CROSS REFERENCE TO RELATED APPLICATIONS

This application is a National Stage Application of International Patent Application No. PCT/JP2008/000710, filed Mar. 25, 2008, which claims priority to Japanese Patent Application No. 2007-093938 filed on Mar. 30, 2007, the disclosure of each which is incorporated by reference herein and priority to each of which is also claimed herein.

TECHNICAL FIELD

The present invention relates to a lens driving device that drives a lens to be displaced in an optical axis direction in order to focus an image of a subject to be photographed.

BACKGROUND OF THE INVENTION

In recent years, the widespread availability of camera phones having a camera function has increased the opportunities for users to photograph various kinds of photographic subjects. For example, a photographic subject at a distance from the camera lens, such as a friend or scenery, is photographed (normal snapshot) or a photographic subject at a close distance from the camera lens, such as a bus time schedule or flower petals, is photographed (close-up photography).

For close-up photography (macro photography), the camera lens needs to be positioned slightly closer to the photographic subject than for a normal snap shot. Therefore, a photographing lens system of this kind is equipped with a drive mechanism that drives the lens to be displaced in the optical axis direction; by switching a switch, the drive mechanism is driven to move the lens in the optical axis direction (see Patent Reference 1: Japanese Patent Application 2005-37865, for example).

The lens driving device disclosed in Patent Reference 1 comprises a lens holder equipped with lenses, a movable body for holding the lens holder, and a fixed body for supporting the movable body to move in the optical axis direction. In the lens driving device of Patent Reference 1, a magnet is attached to the movable body and a drive coil is attached to the fixed body. However, there are lens driving devices in which a drive coil is attached to the movable body and a magnet is attached to the fixed body.

As for the latter lens driving device, an adhesive is generally used for adhering the magnet to the fixed body (a cover portion). In order to heat-harden the adhesive, the manufacturing process of the lens driving device includes the step of placing the magnet and the fixed body in a high temperature room.

However, once the magnet is placed in a high temperature room, its magnetism may be deteriorated due to high temperature depending on the conditions; as a result, the thrust force for moving a movable body may be deteriorated. One may think that if a larger magnet is used, the influence of the deteriorated thrust force is minimized even if magnetism is deteriorated somewhat. However, the demand for smaller lens driving devices has increased and it is difficult to solve this problem by simply enlarging the magnet and the entire lens driving device.

At least an embodiment of the present invention, then, is devised considering the above problems, and provides a lens driving device having improved thrust force for moving a movable body.

SUMMARY OF THE INVENTION

To achieve the above benefits, at least an embodiment of the present invention provides the following.

At least an embodiment of the present invention comprises a movable body for holding lenses and a driving mechanism for moving the movable body in an optical axis direction; wherein the driving mechanism includes coils attached to the movable body and a magnet opposed to said coils; when a gap between the coils and the magnet is expressed as A and the width of the coil is expressed as B, a conditional expression of $0.3B \leq A \leq B$ is satisfied.

According to an embodiment of the present invention, the lens driving device is provided with the movable body and the driving mechanism, wherein the driving mechanism includes coils and a magnet; since a gap A between the coils and the magnet and the width B of the coil are to satisfy $0.3B \leq A \leq B$, the thrust force for moving the movable body can be improved.

More specifically described, when the thickness of the thinnest portion of the magnet in a direction orthogonally intersecting with the optical axis direction is formed thin, the area in the inside circumferential surface of the magnet opposing to the coil becomes large (because of this, the thickness of the coil in the direction orthogonally intersecting with the optical axis can be made large); therefore, the thinner the thickness of this portion is, the better. For this reason, the gap A between the coil and the magnet and the width B of the coil are set to satisfy the conditional expression of $0.3B \leq A \leq B$; when the $0.3B \leq A$ portion is modified, the expression becomes $(A+B)/B \geq 1.3$. First, the value of the gap A between the coil and the magnet is set as small as possible considering the design (consequently, a value of A is determined); then, the value of the width B is adjusted within the range satisfying the above conditional expression (the value of the width B of the coil is limited to the dimension of 10/3 times or less of the gap A). With this configuration, the effective component of magnetic flux from the magnet will be sufficiently supplied to the inside circumference of the coil, which in turn improves the thrust force for moving the movable body even when magnetism is deteriorated to some extent (because the magnet is placed in a high-temp room in the manufacturing process). Note that only the $0.3B \leq A$ portion in calculation may result in a larger coil width B than the gap A between the coil and the magnet, and therefore, a conditional expression of $A \leq B$ is also added considering magnetomotive force.

Also, in at least an embodiment of the present invention, the thickness of the thinnest portion of the magnet is set 0.3 mm or larger.

In many cases, a neodymium (Nd—F—B) sintered magnet is used for the magnet installed in the lens driving device because of its strong magnetic force. The neodymium magnet can be fabricated at its thinnest up to 0.3 mm. The thinner the thickness of this portion is, the more the magnetism is lost (permeance coefficient becomes 1 or less, for example); thus, the magnet becomes useless. Therefore, in at least an embodiment of the present invention, the thickness of the thinnest portion of the magnet in a direction orthogonally intersecting with the optical axis is 0.3 mm or more. Note that, as described above, it is preferred that the thickness of this portion be 0.3 mm to obtain a maximum area [of the magnet] opposing to the coil.

It can be considered in order to improve the thrust force for moving the movable body that the magnet and the coil be extended in the optical axis direction and the value of total current flowing in the coils is increased (the ampere-turn is increased). However, because of a recent demand for minimized lens driving devices as described above, the lens driving device cannot simply be enlarged in an optical axis direction. According to the present invention, then, even in this situation, the thrust force for moving a movable lens can be improved without enlarging the lens driving device itself (without changing the ampere-turn of the coil).

Note that the "magnet" in the present invention can be of any form and size. For example, it may be a square magnet having different widths (thicknesses) at end portions in the circumferential direction of the coil, or may be an annular magnet, or another suitable type of magnet.

Also, in at least an embodiment the present invention, when the lens driving device is in operation, the coils move along the optical axis direction within the range in which magnetic force from the magnet can reach.

More specifically described, the shape of the magnet includes an outside circumferential shape extended along the moving body and provided with corner portions shaped along the four corners of the fixing portion of the magnet; the value of the sum of the thickness of the coil facing the extended face of the magnet and the total moving distance of the coil while the coil keeps facing the magnet is smaller than the thickness of the magnet extending in the optical axis direction.

According to at least an embodiment of the present invention, when the lens driving device is in operation, the above-described coils move in the optical axis direction within the range in which magnetic force from the magnet can reach; therefore, the movable body can be moved while magnetic flux from the magnet is kept supplied to the coil, thus contributing to an improved thrust force.

Also, in at least an embodiment of the present invention, a magnet fixing portion having an inside circumferential face opposed to the outside circumferential face of the magnet be provided, the magnet fixing portion have a polygonal cross-section when taken along the direction orthogonal to the optical axis direction, and the magnet be arranged in plural at the corner portions of the inside circumferential face [of the magnet fixing portion].

More specifically described, the magnet fixing portion is a back yoke whose cross-section orthogonally intersecting with the optical axis is rectangle, and is held between a base for supporting the drive mechanism and a support body configured by a case. The drive coil is an annular coil arranged along the height of the moving body; the magnet is shaped such that the inside circumference thereof is shaped along the annularly-shaped outside circumferential face of the coil and the outside circumference thereof is divided in four to correspond to the inside circumferential portion of the magnet fixing portion so as to have corners shaped along the four corners of the magnet fixing portion.

According to at least an embodiment of the present invention, the magnet fixing portion having the inside circumferential surface opposed to the outside circumferential face of the magnet is provided; since the magnet is arranged in plural (four, for example) at the corner portions of the inside circumferential face, the thrust force for moving the movable body can be improved while satisfying a demand for minimized lens driving devices.

More specifically, a lens driving device sometimes needs to be entirely in a rectangular parallelepiped shape for precise positioning in relation to an apparatus (for example, a cellular phone) in which the lens driving device is installed (since a rectangular parallelepiped has four corners, the device can be easily positioned). Then, for arranging an annular coil positioned along a cylindrical lens holder in a rectangular parallelepiped-shaped enclosure (case), the magnet is divided by four and the divisions may be arranged in the four corners of the enclosure (in other words, four [magnets] may be arranged at the above-described corner portions on the inside circumferential face of the magnet fixing portion). At that time, the opposing area between the coil and the magnet may become small because the magnet is divided, possibly resulting in weakened thrust forth. However, according to the lens driving device of the present invention, even when this thrust force is weakened, the thrust force for moving a movable body can be improved.

It is preferred that the thickness of the thinnest portion of the magnet in a direction orthogonally intersecting with the optical axis be 0.3 mm to maximize the opposing area between the coil and the magnet in consideration of the working limits of the magnet.

According to the lens driving device of the present invention, the thrust force for moving a movable body can be improved without enlarging the lens driving device.

BRIEF DESCRIPTION OF DRAWING

Embodiments will now be described, by way of example only, with reference to the accompanying drawings which are meant to be exemplary, not limiting, and wherein like elements are numbered alike in several Figures, in which:

[FIG. 3(A)-3(C)] Diagrams to explain in detail a fixed body and sleeve of the lens driving device shown in FIG. 1.

BEST FORM OF EMBODIMENT

Figure 1A:
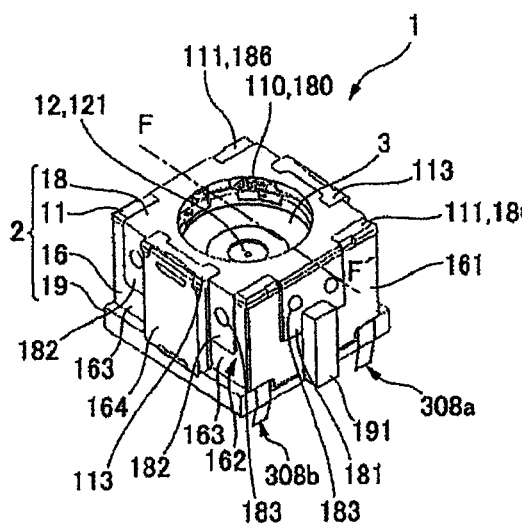
[FIGS. 1(A)-1(B)] Diagrams showing a mechanical configuration of a lens driving device of an embodiment of the present invention.
Figure 1B:
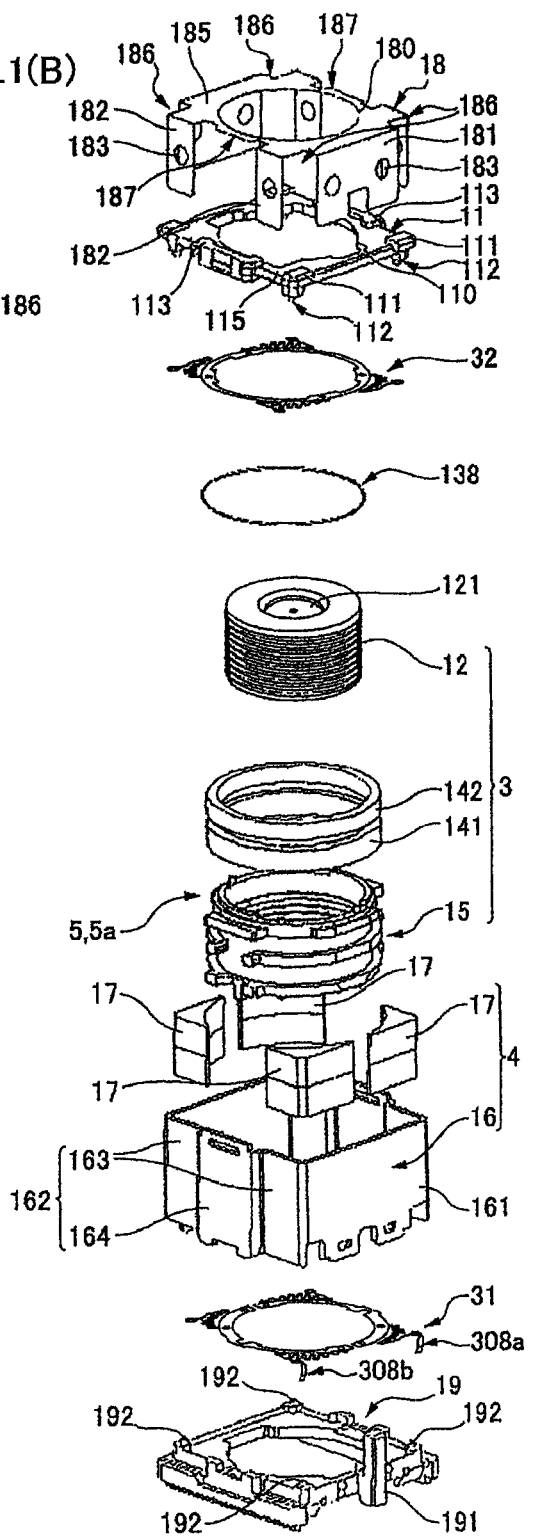
Figure 2:
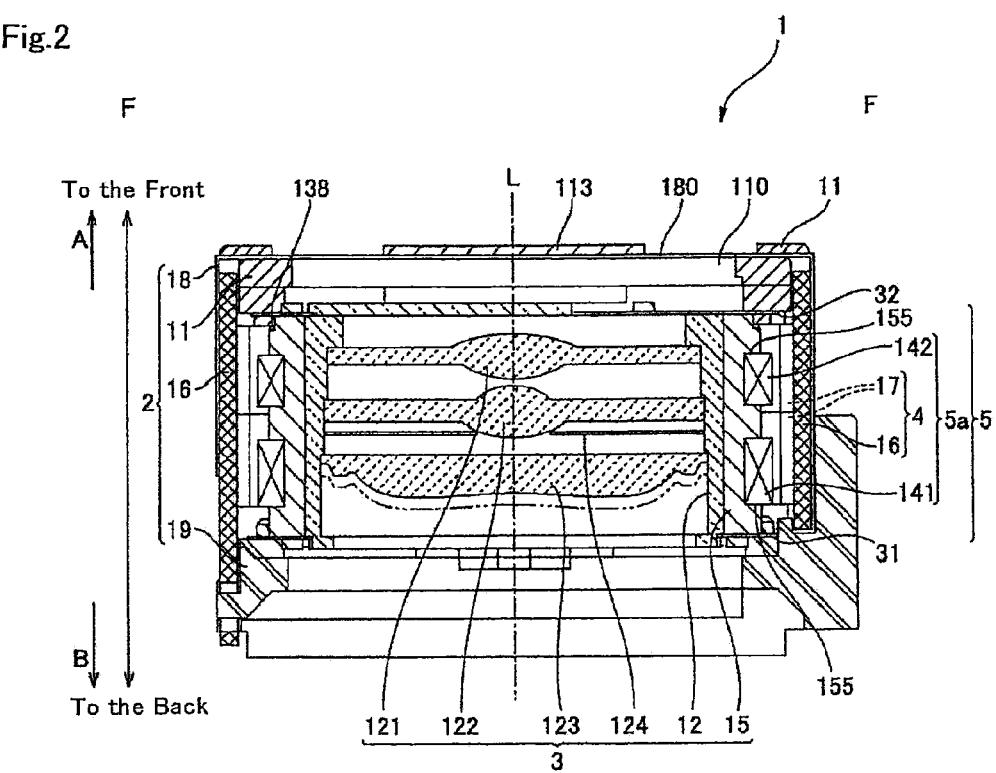
[FIG. 2] A cross-sectional view of the lens driving device shown in FIG. 1(A), taken along an optical axis direction, L, in the position of F-F'.

At least an embodiment of the present invention will be described referring to the drawing.
[Mechanical Configuration]
FIGS. 1(A)-1(C) shows diagrams of a mechanical configuration of a lens driving device 1 of an embodiment of the present invention. FIG. 1(A) is an external view of the lens driving device 1 diagonally viewed from top; FIG. 1(B) is a perspective view of disassembly of the lens driving device 1. FIG. 2 is a cross-sectional view of the lens driving device 1 taken along the optical axis direction, L, in the F-F' position.

In FIGS. 1(A)-1(C) and FIG. 2, the lens driving device 1 moves three lenses 121, 122 and 123, which are arranged in an optical axis direction, in both the A direction (to the front) and the B direction (to the back) along the optical axis, the A direction in which the lenses are moved toward a photographic subject (toward an object) and the B direction in which the lenses are moved in the opposite direction from the photographic subject (toward an image) (see FIG. 2); the device is in a rectangular parallelepiped shape (see FIG.

1(A)). The lens driving device 1 has a movable body 3 which holds the three lenses 121, 122 and 123 and a fixed aperture 124 integrally in a cylindrical lens holder 12, a lens driving mechanism 5 that moves the movable body 3 along the optical axis direction, L, and a fixed body 2 as a support body to which the lens driving mechanism and the movable body 3 are mounted. The movable body 3 is provided with a cylindrical sleeve 15 inside which the cylindrical lens holder 12 is adhered.

The fixed body 2 is provided with a rectangular base 19 for holding an image pick-up device (not illustrated) on the image side, a rectangular case 11 positioned on the photographic subject side, a sheet-like cover 18 which covers the end of the case 11 on the photographic subject side; circular light-entrance windows 110 and 180 are respectively formed in the center of the case 11 and the sheet-like cover 18 for collecting the light reflected from the photographic subject into the lenses. The fixed body 2 is also provided with a quadrangle barrel-shaped back yoke 16 held between the base 19 and the case 11; the back yoke 16 together with a drive magnet (magnet) 17, which will be described later, configure an interlinked magnetic field producing body 4 which causes interlinked magnetic field to drive coils 141 and 142.

The lens driving mechanism 5 is provided with annular first drive coil 141 and a second drive coil 142, arranged in two rows in the optical axis direction on the outside circumferential face of the sleeve 15, and the interlinked magnetic field producing body 4, by all of which configures a magnetic driving mechanism 5*a* (see FIG. 2). The interlinked magnetic field producing body 4 is provided with the four drive magnets 17 opposed to the drive coils 141 and 142 on the outside circumference side and the quadrangle barrel-shaped back yoke 16 formed from a ferromagnetic sheet such as a steel sheet; the four drive magnets 17 are fixed at the four corner portions in the inside circumferential face of the back yoke 16.

The back yoke 16 mentioned here has an inside circumferential face opposing to the outside circumferential face of the drive magnets 17; therefore, it functions as an example of the "magnet fixing portion", and the drive magnets 17 are arranged at the corner portions (at the four corners) of the inside circumferential face of [the magnet fixing portion]. In other words, the drive magnets 17 are arranged at the corner portions formed between the annular first drive coil 141 and second drive coil 142 and the rectangular back yoke 16. Note that, although [the magnet] is shaped to have a rectangular cross-section in this embodiment, it may be shaped polygonal such as pentagon or octagon, for example.

The four drive magnets 17 extend along the movable body 3; each magnet is divided into two in the optical axis direction, L, and is magnetized to different poles on the inside face and on the outside face. The four drive magnets 17 are magnetized as follows: in the top half, the inside face is magnetized to N pole and the outside face is magnetized to S pole; in the bottom half, the inside face is magnetized to S pole and the outside face is magnetized to N pole. The back yoke 16 is held between the base 19 and the case 11, and is exposed at the side face of the lens driving device 1, configuring the side face portion [of the device]. Note that the magnet used in this embodiment is a Nd—F—B sintered magnet.

The lens driving mechanism 5 is provided with a first flat spring 31 held between the back yoke 16 and the base 19 as well as a second flat spring 32 held between the back yoke 16 and the case 11. The first flat spring 31 and second flat spring 32 are both formed from a metal sheet; by designing them in the same thickness in the optical axis direction, L, productivity can be improved.

Note that the inside circumferential face of the drive magnet 17 is formed to be in line with the outside circumferential face of the annular coil.

The back yoke 16 is formed larger than the size of the area in the optical axis direction, L, in which the drive coils 141 and 142 are arranged and the dimension of the drive magnet 17 in the optical axis direction, L. Therefore, magnetic flux leakage from a magnetic path configured between the drive magnets 17 and the first drive coil 141 and a magnetic path configured between the drive magnets 17 and the second drive coil 142 can be reduced. As a result, linearity between the moving amount of the sleeve 15 and the current flowing in the drive coils 141 and 142 can be improved. Note that the above-mentioned effect such as reduced magnetic flux leakage can be obtained with the back yoke 16 of this embodiment without forming the back yoke 16 in such a shape covering the side face and the bottom face or top face of the drive coil 141, 142.

The lens driving device 5 is further provided with an annular magnetic piece 138 held at the top end of the sleeve 15 (see FIG. 1(B)). The magnetic piece 138 applies an urging force in the optical axis direction L on the movable body 3 with an attraction force working between the drive magnets 17 and itself. Therefore, the movable body 3 is prevented from changing positions due to the weight thereof when current is not supplied; thus, the movable body 3 can be kept in a desired position. Also, the magnetic piece 138 functions as a kind of back yoke with which magnetic flux leakage can be reduced at the magnetic path configured between the drive magnets 17 and the first drive coil 141 and the magnetic path configured between the drive magnets 17 and the second drive coil 142. Note that the lens driving device 1 has terminals 308*a* and 308*b* for the drive coils 141 and 142.

FIGS. 3(A)-3(C) shows diagrams to explain in detail the fixed body 2 and the sleeve 15 of the lens driving device 1 shown in FIGS. 1(A)-1(C): FIG. 3(A) shows the state viewed from the photographic subject side, in which the case 11 and the sheet-like cover 18 are removed; FIG. 3(B) shows the state viewed from the photographic subject side, in which the first flat spring 31 and the second flat spring 32 are mounted to the sleeve 15; FIG. 3(C) shows the state viewed from the image pick-up device side, in which the first flat spring 31 and the second flat spring 32 are mounted to the sleeve 15.

As shown in FIG. 1 and FIG. 3(A), the back yoke 16 is shaped such that the outside circumference thereof is a rectangle; a pair of opposing side face portions 161 are formed in a flat surface, and the other pair of opposing side surface portions 162 have side end portions 163 recessed toward the inside and a projecting portion 164 projecting as a step toward the outside in the center thereof. Therefore, when viewing the back yoke 16 from the optical axis direction, L, the rectangular area walled by the side face portions 161 and the side end portions 163 of the side face portions 162 is a space for the flat springs 31 and 32 to be arranged in.

The case 11 covers the end of the back yoke 16 on the photographic subject side, and has a plate portion 115 which has a light-entrance window formed in the center thereof. In four corners of the plate portion 115, protruding portions 111 project toward the photographic subject side and protruding portions 112 project toward the image pickup device side; in a pair of opposing side portions of the plate portion 115, holding portions 113 are formed for holding engaging portions of the sheet-like cover 18 in the circumferential direction on the top face of the plate portion 115, the engaging portions being described later. Also, in the base 19, protruding portions 192 project toward the photographic subject side at four corners and a column-like member 191 extends from the side face toward the photographic subject. Note that the protruding portions 192 of the base 19 and the protruding portions 112 of the case 11 are used for joining the flat springs 31 and 32 to the fixed body 2, the flat springs being described later.

The sheet-like cover 18 is formed by a non-magnetic sheet (SUS304, for example); it covers the end of the case 11 on the photographic subject side and has a ceiling portion 185 having a light-entrance window 180 in the center thereof. The ceiling portion 185 is formed in a rectangular shape; at the four corners thereof and near the center of a side thereof, a rectangle notch 186, 187 is formed respectively. A pair of engaging leg portions 181 extend downwardly from a pair of opposing side portions of the ceiling portion 185. Also, at a pair of other opposing side portions of the ceiling portion 185, a pair of leg portions 182 project downwardly from both ends which sandwich the notch 187. In each of the engaging leg portions 181 and 182, a through hole 183 is formed in the vicinity of the center area.

With the above configuration, for overlaying the sheet-like cover 18 where the base 19, the first flat spring 31, the second flat spring 32 and the case 11 are already layered, the notches 187 of the sheet-like cover 18 are respectively fitted to the holding portions 113 of the case 11 to position the sheet-like cover 18 on top of the case 11. At that time, inside the notches 186 formed at the four corners of the ceiling portion 185, the protruding portions 111 formed at the four corners of the case 11 are positioned. Also, the engaging leg portions 181 make contact with the side face portions 161 of the back yoke 16, and the engaging leg portions 182 make contact with the side face portions 162 of the back yoke 16 and also sandwich the protruding portions 164 between them. By applying an adhesive through the through hole 183 to the engaging leg portions 181 and 182 arranged in the above manner, the side face portions 161 and 162 and the engaging leg portions 181 and 182 are fixed together. Also, by joining the side face portions 161 and 162 with the engaging leg portions 181 and 182 by laser soldering, the sheet-like cover 18 can be fixed to the back yoke 16.

As shown in FIGS. 1(A)-1(C) and FIGS. 3(A)-3(C), at the side face of the sleeve 15 and on the optical axis direction, L, stop portions 151, 152 and 153 projecting toward the outside circumference are respectively formed at the end portion on the photographic subject side, at the center area and at the end portion on the image pickup device side. The stop portions 151, 152, and 153 are respectively provided at two positions such that they face sandwiching the sleeve 15 between them. On the side face of the sleeve 15, two groove portions 155 are annularly formed in the circumferential direction passing between the stop portions 151, 152 and 153; by winding coils in the two groove portions 155, the drive coils 141 and 142 can be arranged around the outside circumference of the sleeve 15.

Further, as shown in FIG. 3(B), fitting portions 156 which extend in the circumferential direction are formed on the edge portion of the sleeve 15 on the photographic subject side; as shown in FIG. 3(C), column-like portions 157 which stand upright toward the image pickup device are formed at the opposing positions on the edge portion of the sleeve 15 on the image pickup device side. They are used for mounting the flat springs 31 and 32 in the sleeve 15, the flat springs being described later. To arrange the sleeve 15 (movable body 3) configured as above in the fixed body 2, the stop portions 151, 152 and 153 are arranged inside the protruding portions 164 of the back yoke 16. Note that, the surface of the stop portions 151, 152 and 153 which makes contact with the inside of the protruding portions 164 of the back yoke 16 may be formed in an R-shaped face or an angular face.

Figure 4A:
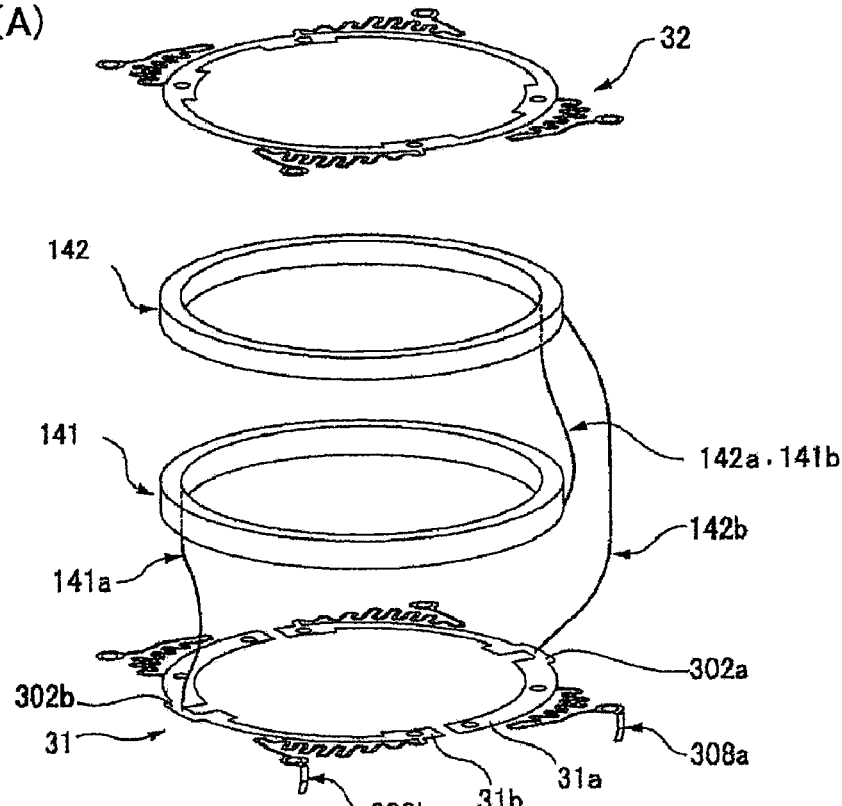
[FIG. 4(A)-(B)] Schematic diagram showing an example of the connection of the drive coils in the lens driving device shown in FIG. 1.
Figure 4B:
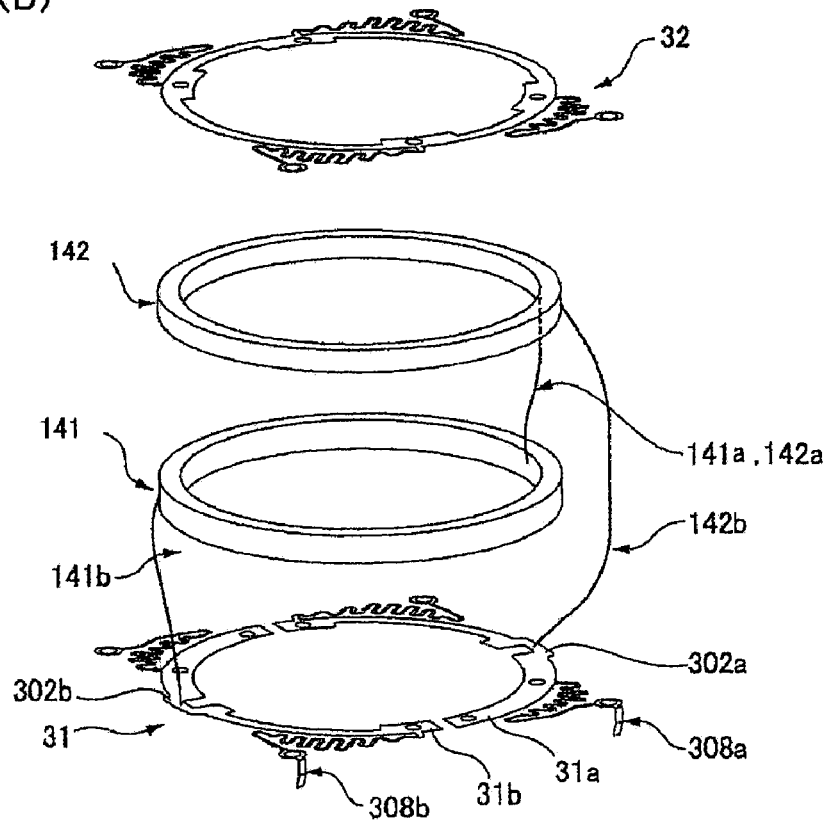

Next, a current-supply structure to supply current to the drive coils 141 and 142 is described. FIGS. 4(A)-4(B) shows schematic diagrams of an example of the connection of the drive coils 141 and 142 in the lens driving device 1 shown in FIGS. 1(A)-1(C).

In the lens driving device 1 of this embodiment, as shown in FIG. 3(B) and (C), the first flat spring 31 and the second flat spring 32 are joined to the top and bottom ends of the sleeve 15 (movable body 3). The flat spring 31 and the flat spring 32 both support the movable body 3 to be displaceable in the optical axis direction, L, and function to prevent the movable body 3 from turning about the optical axis.

The first flat spring 31 and the second flat spring 32 are formed in the identical shape; they are arranged to face each other. Also, the second flat spring 32 is formed as a whole unit while the first flat spring 31 consists of two spring pieces 31a and 31b which are electrically separated, and the terminals 308a and 308b are respectively formed to the spring pieces 31a and 31b. Therefore, as shown in FIGS. 4(A) and (B), when the coil terminals of the drive coils 141 and 142 are electrically connected to the spring pieces 31a and 31b, current can be supplied to the drive coils 141 and 142 via the terminals 308a and 308b. Note that the first flat spring 31 has the same configuration as the second flat spring 32 when the two spring pieces 31a and 31b are laid on a flat.

Among the first flat spring 31 and the second flat spring 32 configured as above, in order to use the second flat spring 32 to supply current to the drive coils 141 and 142, as shown in FIG. 4(A), a beginning winding 141a pulled out from the inside circumference of the drive coil 141 is soldered to a coil connection line 302b formed to the spring piece 31b while an ending winding 142b pulled out from the outside circumference of the drive coil 142 is soldered to the coil connection line 302a formed to the spring piece 31a. Also, the ending winding 141b pulled out from the outside circumference of the drive coil 142 and the beginning winding 142a pulled out from the inside circumference of the drive coil 142 are connected with each other. With this configuration, the drive coils 141 and 142 can be connected in series and the winding directions of the drive coils 141 and 142 can be in the same direction. Note that, when the drive coils 141 and 142 are arranged in the above manner, the magnetizing directions of the drive magnets 17 arranged in the top half and bottom half are in the same direction.

Also, the connection example shown in FIG. 4(B) may also be adopted. In other words, the ending winding 141b pulled out from the outside circumference of the drive coil 141 is soldered to the coil connection line 302b formed to the spring piece 31b while the ending winding 142b pulled out from the outside circumference of the drive coil 142 is soldered to the coil connection line 302a formed to the spring piece 31a. At that time, the beginning winding 141a pulled out from the inside circumference of the driving coil 141 is connected with the beginning winding 142a pulled out from the inside circumference of the drive coil 142. With such a configuration, the drive coils 141 and 142 can be connected in series. In this case, the winding directions of the drive coils 141 and 142 can be in the opposite directions from each other; therefore, [this configuration] can be applied to this embodiment in which the magnetizing directions are opposite in the top half and the bottom half of the drive magnets 17.

[Basic Operation]

In the lens driving device 1 of this embodiment, the movable body 3 is normally positioned on the image pickup device side (on the image side) (see FIG. 2). More specifically, the bottom end face (the face on the image side) of the sleeve 15 is in contact with the top face (the front face) of the base 19.

When, in this state, current flowing in a predetermined direction is supplied to the drive coils 141 and 142, the drive coils 141 and 142 respectively receive upward electromagnetic force (toward the front). Because of this, the sleeve 15 in which the drive coils 141 and 142 are adhered starts moving toward the photographic subject (to the front). At that time, resilient force that prevents the movement of the sleeve 15 is produced between the flat spring 31 and the front end of the sleeve 15 and between the flat spring 32 and the rear end of the sleeve 15. Therefore, when the electromagnetic force which moves the sleeve 15 to the front attains equilibrium with the resilient force which prevents the movement of the sleeve 15, the sleeve 15 comes to stop. When current flowing in the opposite direction is supplied to the drive coils 141 and 142, the drive coils 141 and 142 respectively receive downward electromagnetic force (toward the back).

At that time, the amount of current flowing in the drive coils 141 and 142 and the resilient force of the flat springs 31 and 32 exerting on the sleeve 15 are adjusted to stop the sleeve 15 (movable body 3) in a desired position. If the urging force of the magnetic piece 13B held by the movable body 3 and the drive magnet 17 is also utilized, the magnetic driving mechanism 5a that causes driving force in the optical axis direction, L, to the movable body 3 can be minimized. Also, by using the flat springs 31 and 32 having an established linear relationship between the resilient force and the amount of displacement, linearity between the moving amount of the sleeve 15 and the amount of current flowing in the drive coils 141 and 142 can be improved. Since two resilient members which are the flat springs 31 and 32 are used, a large force in equilibrium is applied in the optical axis direction, L, when the sleeve 15 stops; therefore, even when an external force such as a shock is exerted in the optical axis direction, L, the sleeve 15 can be stopped in a more stable manner. Furthermore, by stopping the sleeve 15 by using equilibrium between the electromagnetic force and the resilient force, colliding noise can be prevented.

[Dimensions of Drive Coil and Magnet]

Figures 5A, 5B:
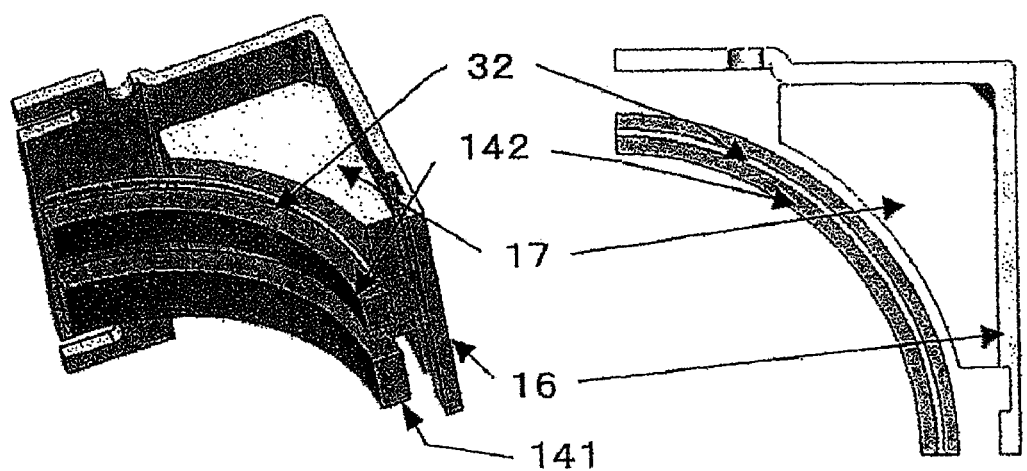
[FIG. 5(A)-(B)] A schematic diagram schematically showing a portion of the lens driving device of this embodiment.

FIGS. 5(A)-5(B) shows schematic diagrams of part of the lens driving device 1 of this embodiment.

The schematic diagram in FIG. 5(A) shows one of the four segments of the lens driving device 1 obtained by dividing the device 1 by four in the optical axis direction, L, and it is viewed diagonally. As the components, the drive coils 141 and 142, the back yoke 16, the drive magnet 17, and the flat spring 32 are shown, but other components are omitted in the illustration for convenience. Note that FIG. 5(B) is a schematic plan view of FIG. 5(A) viewed from the top.

Figure 6A:
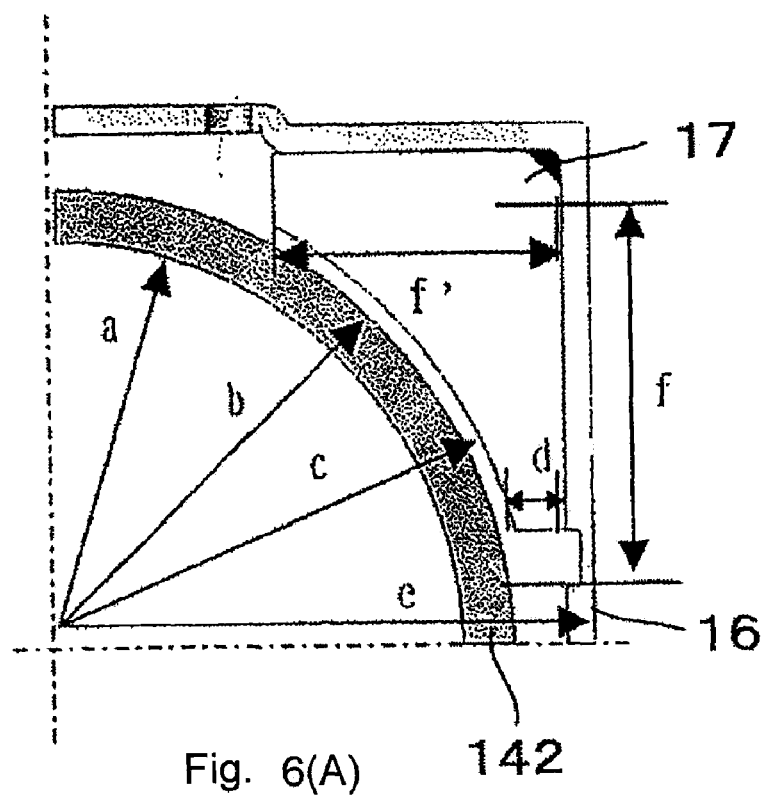
[FIG. 6(A)-(B)] Explanatory diagrams to explain in detail the dimensions of the drive coil and the drive magnet.
Figure 6B:
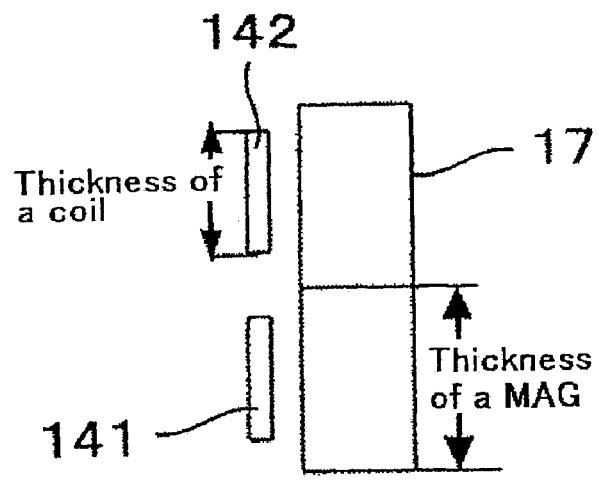

FIGS. 6(A)-6(B) shows explanatory diagrams to explain in detail the dimensions of the drive coil 141, 142 and the drive magnet 17. In particular, FIG. 6(A) is a diagram of which the dimensions are indicated by a, b, c, d, e, f, and f' in the schematic plan diagram in FIG. 5(B); FIG. 6(B) is a side view of the simplified schematic diagram of FIG. 5(A), viewed from the side. Note that in FIG. 6(A), "a" indicates the inside diameter of the drive coil 141, "b" indicates the outside diameter of the drive coil 141, "c" indicates the inside diameter of the drive magnet 17, "d" indicates the thickness of the edge of the drive magnet 17, "e" indicates the outside diameter of the back yoke 16, and "f" and "f'" indicate the side widths of the drive magnet 17.

In FIGS. 6(A)-6(B), c-b (a gap between the drive coil 141, 142 and the drive magnet 17) is given as small as possible considering design limits in order to optimize the magnetic circuit of the lens driving device 1 of this embodiment.

Next, each parameter is adjusted to satisfy (c−b)≦(b−a) and (c−a)/(b−a)≧1.3. In this way, the gap A between the drive coil 141, 142 and the drive magnet 17 (=c−b) and the width B of the coil (=b−a) are determined. With this, effective component of the magnetic flux from the drive magnet 17 is sufficiently supplied to the inside circumference [lit: diameter] of the drive coils 141 and 142, thus improving the thrust force for moving the movable body 3.

Also, d is set to 0.3 mm or more. With this, the opposing area between the drive coil 141, 142 and the drive magnet 17 can be maximized within the range of the working limits on the drive magnet 17, thus contributing to the improvement of the thrust force for moving the movable body 3.

As shown in the side view in FIG. 6(B), it is designed that the value of the sum of the coil thickness of the drive coil 142 and the total stroke (total moving distance) of the drive coil 142 is smaller than the thickness 142a of the magnet which corresponds to the extension surface of the drive magnet 17 arranged on the top side formed along the movable body 3. In the same manner, it is designed that the value of the sum of the coil thickness of the drive coil 141 corresponding to the magnet thickness 141a and the total stroke of the drive coil 141 be smaller than the thickness of the drive magnet 17 arranged on the bottom side. With this configuration, when the lens driving device 1 is in operation, the drive coils 141 and 142 move along the optical axis direction within the range in which magnetic force from the drive magnet 17 reaches; consequently, the movable body 3 can be moved while magnetic flux from the drive magnet 17 is kept supplied to the drive coils 141 and 142, thus contributing to the improvement of the thrust force.

Furthermore, f and f' are extended within the range satisfying the condition, d≧0.3 mm to obtain a [sufficient] opposing area between the drive coils 141 and 142 and the drive magnet 17. With this, the thrust force for moving the movable body 3 can be further improved.

[Embodiment]

Figure 7A:
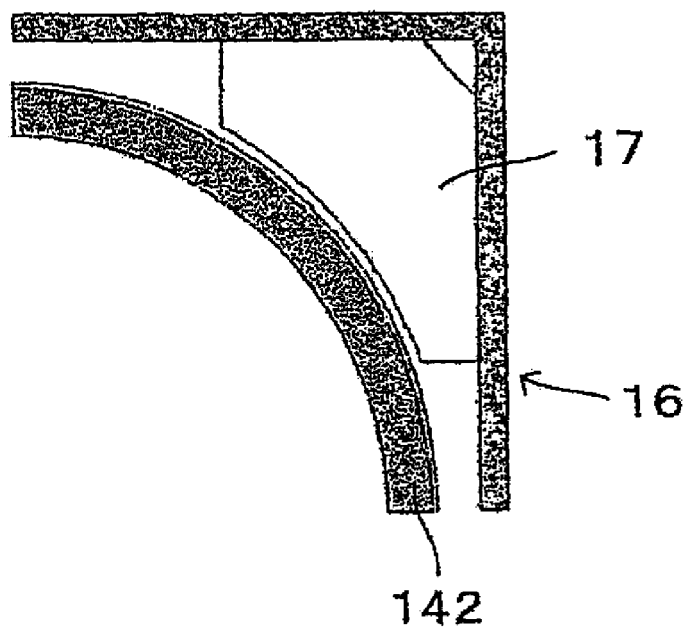
[FIG. 7(A)-(B)] Explanatory diagrams to generally explain the lens driving device of the embodiment of the present invention.
Figure 7B:
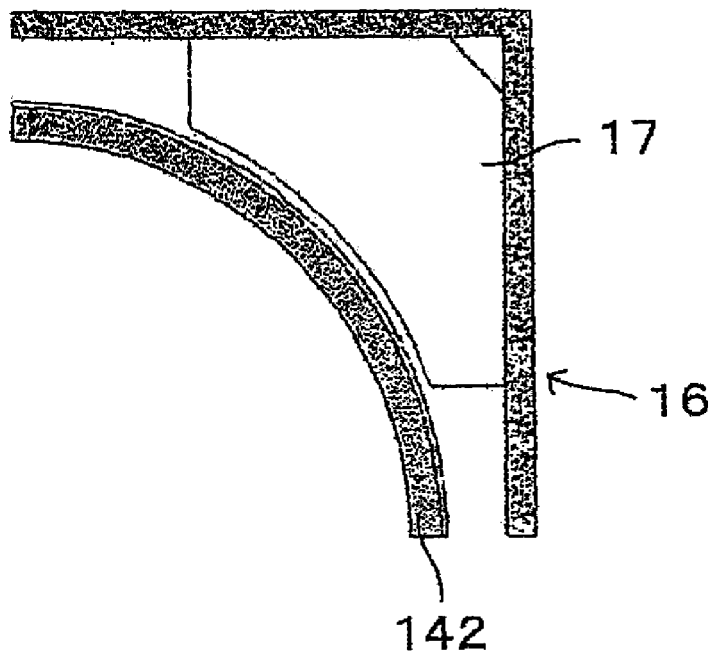

FIGS. 7(A)-7(B) is explanatory diagrams to explain the general concept of the lens driving device 1 of the embodiment of the present invention. FIG. 7(A) is a schematic diagram of (part of) the lens driving device in the state before the condition explained by referring to FIGS. 6(A)-6(B) is satisfied; FIG. 7(B) is a schematic diagram (of part) of the lens driving device 1 in the state after the condition explained by referring to FIGS. 6(A)-6(B) is satisfied.

In FIGS. 7(A)-7(B), the outside diameter of the drive coil 141 and 142 is changed from 8.0 mm to 7.0 mm. The inside diameter of the drive magnet 17 is changed from 8.3 mm to 8.0 mm. Therefore, the gap between the coils and the magnet is 0.15 mm. The thickness of the edge of the drive magnet 17 is changed such that one on the f side is 0.49 mm and one on the f' side is 0.72 mm. The thickness of the drive coils 141 and 142 is respectively set to 0.7 mm and 0.8 mm. As a result, the thrust force for moving the movable body 3 could be improved.

Figures 8A, 8B:
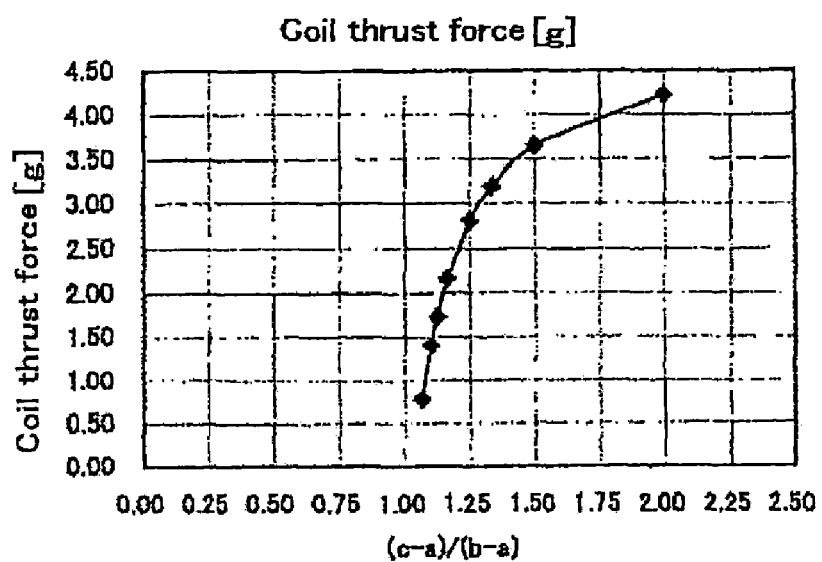
[FIG. 8(A)-(B)] The result of the experiments on the thrust force of the drive coil using the lens driving device shown in FIGS. 7(A)-7(B).

FIGS. 8(A)-8(B) shows that, in the above value settings, results of the change in the coil thrust force where the ampere-turn of the coil is kept constant but the width of the coil (b−a) is changed while magnetomotive force is kept constant.

FIGS. 8(A)-8(B) shows results of the experiment on the thrust force of the drive coils 141 and 142 by using the lens driving device 1 shown in FIGS. 7(A)-7(B). More specifically described, it shows, in this embodiment, analysis results in which the response relationship between the coil widths of the drive coils 141 and 142 and the gap are analyzed FIG. 8(B) is a 2D plot graph of the experiment results of FIG. 8(A). According to FIG. 8(B), when (c−a)/(b−a) is 1.5 or more, there is no sudden decrease of the coil thrust force (it is gradually decreased). With (c−a)/(b−a) around 1.3, the coil thrust force starts declining greatly; with (c−a)/(b−a) at 1.25 or less, the coil thrust force sharply drops. Therefore, (c−a)/(b−a)≧1.3 is the condition to prevent a great decline of the coil thrust force. When this expression is substituted with A and B, it becomes (B+A)/B≧1.3 and further becomes A≧0.3B.

Note that, although a Nd—F—B (Neodymium) sintered magnet is used for the magnet in the embodiment, a Nd—F—B (Neodymium) bonded magnet may be used.

The lens driving device 1 described above can be installed in various electronic apparatus besides camera phones. For example, [it can be installed in] PHSs, PDAs, barcode readers, thin digital cameras, surveillance cameras, vehicle backside-checking cameras, and doors having an optical verification function.

[Possibility of Industrial Use]

The lens driving device of the present invention is effectively used to improve the thrust force for moving a movable body.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens driving device comprising:
   a movable body holding lenses;
   a driving mechanism for moving said movable body in an optical axis direction;
   wherein said driving mechanism has coils attached to said movable body and a magnet opposed to said coils;
   in a direction intersecting with said optical axis direction, a gap A between said coils and said magnet and a width B of said coils satisfies the following conditional expression:

0.3B≦A≦B.

2. The lens driving device of claim 1 wherein a thickness of a thinnest portion of said magnet is 0.3 mm or more.

3. The lens driving device of claim 1 wherein, when said lens driving device is in operation, said coils move along the optical axis direction within a range in which magnetic force from said magnet can reach.

4. The lens driving device of claim 1 wherein a magnet fixing portion having an inside circumferential face opposed to an outside circumferential face of said magnet is provided;
   said magnet fixing portion has a polygonal cross-section when taken along a direction orthogonally intersecting with the optical axis direction;
   said magnet is arranged in plural at corner portions of said inside circumferential face.

5. The lens driving device of claim 4 wherein said movable body is in a cylindrical shape extending in the optical axis direction;
   said magnet has an outside circumferential shape which extends along said movable body and has corner portions along four corners of said magnet fixing portion; and
   a sum of a thickness of said coils opposing to said extending face of said magnet and a total moving distance of said coils while facing said magnet is smaller than a thickness of said magnet in the optical axis direction.

6. The lens driving device of claim 5 wherein said drive coils are annular coils arranged along a height of said movable body;
   said magnet fixing portion is a back yoke whose cross-section orthogonally intersecting with the optical axis direction is rectangular; and a shape of said magnet has an inside circumferential shape which curves along an annular outside circumferential face of said coils and has an outside circumferential shape having corner portions, which are created by dividing said magnet into four to correspond with an inside circumferential portion of said magnet fixing portion, along the four corners of said magnet fixing portion.

7. The lens driving device of claim 4 wherein said magnet fixing portion is formed by a back yoke and held between a base supporting said driving mechanism and a support body formed by a case.

* * * * *